United States Patent [19]

Angelmayer et al.

[11] Patent Number: 5,466,772
[45] Date of Patent: Nov. 14, 1995

[54] UNSATURATED POLYURETHANES AND THEIR USE AS DISPERSANTS FOR ALKYD RESINS

[75] Inventors: Karl-Hans Angelmayer, Eltville; Gerd Walz, Wiesbaden; Joachim Zoeller, Mainz, all of Germany

[73] Assignee: Hoechst Aktiengesellschaft, Germany

[21] Appl. No.: 205,600

[22] Filed: Mar. 3, 1994

[30] Foreign Application Priority Data

Mar. 5, 1993 [DE] Germany .......................... 43 06 946.0

[51] Int. Cl.$^6$ .................................................. C08G 18/28
[52] U.S. Cl. ........................... 528/73; 528/74.5; 528/75; 528/76; 528/80; 528/85; 528/87; 528/99; 528/106; 528/111.5; 524/457; 524/589; 524/599; 524/609; 428/441; 428/442
[58] Field of Search .................. 528/73, 74.5, 75, 528/76, 80, 85, 87, 99, 106, 111.5; 524/457, 589, 599, 609; 428/441, 442

[56] References Cited

U.S. PATENT DOCUMENTS 4,116,902  9/1978  Harris et al. ..................... 260/22 TN Primary Examiner—James J. Seidleck
Assistant Examiner—Duc Truong
Attorney, Agent, or Firm—Bierman and Muserlian

[57] ABSTRACT

Unsaturated polyurethanes containing from 20 to 80% by weight of polyethylene glycol units, which can be prepared by reacting a) at least one organic polyisocyanate, b) an unsaturated fatty alcohol or its polyalkylene glycol ether, an unsaturated fatty amine or a reaction product of an unsaturated fatty acid and a monoepoxide, c) a compound which contains not only two groups which react with isocyanate groups but also at least one group which is ionic.

d) a polyalkylene glycol having a molecular mass of from 750 to 10,000, and if desired e) a compound containing from three to six hydroxyl or amino groups, the ratio of the isocyanate groups in a) to the hydroxyl and amino groups in the remaining components being from 0.7:1 to 1.2:1. These unsaturated polyurethanes are used as dispersants for alkyd resins.

6 Claims, No Drawings

UNSATURATED POLYURETHANES AND THEIR USE AS DISPERSANTS FOR ALKYD RESINS

The present invention relates to a method of preparing aqueous dispersions of alkyd resins using dispersants prepared specifically for this purpose.

Although water-dilutable coating binders have in recent years grown continually in importance the current range of water-dilutable binder systems remains incomplete, so that the replacement of all conventional coating compositions is still not possible at present. It is in particular the air-drying alkyd resins, which are generally employed in the form of solutions in aliphatic or aromatic hydrocarbons, for which it is currently not possible to find fully adequate replacements. Neither the visual impression (evenness, gloss) nor the protective action (water resistance, weathering resistance) of films formed from aqueous polymer dispersions (based, e.g., on polyvinyl acetate, polyolefins or polyacrylates) approach the standard of quality of the conventional alkyd resins. Even water-soluble alkyd resins for air-drying coatings have not yet been able to establish themselves. This is partly because the requirement of water-solubility necessitates a reduction in the average molecular weight of the resins. This inevitably results in a retardation in drying. Moreover, despite their low molecular weight these resins require relatively large amounts of—in some cases toxic—auxiliary solvents (e.g. glycol ethers) and organic amines.

On the other hand, aqueous dispersions of alkyd resins should enable an ideal solution to this problem, since they generally make it possible to dispense with organic solvents entirely, and the drying properties would correspond to those of the conventionally dissolved resins, since the molecular weight limitation which applies to the water-soluble resins is not necessary. Despite this, these alkyd resin dispersions have also not as yet acquired any great importance, since hitherto there has been no successful, optimal solution to the problem of stabilizing the dispersions without adversely affecting the other properties.

Alkyd resins are predominantly hydrophobic substances which do not per se form stable dispersions in water. It is therefore necessary to add emulsifiers. Emulsifiers are in general substances having an amphipathic molecular structure, i.e. they are composed of molecules having a hydrophobic and a hydrophilic moiety. As a-result of this structure the emulsifier molecules accumulate at the water/resin interface, reduce the interfacial tension, and thus enable the formation of very fine resin droplets in the aqueous phase.

The most favorable results achieved up to now have been with nonionic emulsifiers formed by condensation of ethylene oxide with octyl- or nonylphenol, i.e. in which the hydrophobic moiety is composed of the alkylphenol radical and the hydrophilic moiety of the polyethylene glycol chain. Systems of this type are described in U.S. Pat. Nos. 3,223,658, 3,269,967 and 3,440,193 and in DD Patent 88 833 and DE 27 54 091. Emulsifiers of this kind, added in quantities of from 5–10%, give dispersions of serviceable stability. The disadvantage consists in the fact that these emulsifiers remain unchanged in the film and thus bring about a significant reduction in the water resistance. The scope for application of such dispersions is therefore very restricted.

Another way of preparing alkyd resin dispersions is described in many publications, for example in U.S. Pat. Nos. 2,634,245, 2,853,459, 3,133,032, 3,223,659, 3,379,548, 3,437,615, 3,437,618, 3,442,835, 3,457,206 and 3,639,315 and in DE A 14 95 031, DE 25 54 330 or in GB-B 1 038 696, 1 044 821 and 2 456 277. According to these publications, polyethylene glycol chains are incorporated directly into the alkyd resin by esterification or transesterification. The advantage compared to the method using "foreign" emulsifiers is said to be an improvement in the water resistance of the films, which improvement is attributed to the chemical bonding of the hydrophilic groups to the resin molecules. In fact, the results which one tends to find, especially on substrates such as metal or glass which do not absorb water, are relatively poor. German Patents DE 27 54 141, 27 54 092 and 24 40 946 describe alkyd resin dispersions which are stabilized using emulsifiers in the aqueous phase and which contain polyethylene glycols, fatty acids and/or allyl ethers. European Patent EP 0 501 247 describes polyurethanes which are employed as emulsifiers and which contain an unsaturated ether alcohol component. These emulsifiers can be incorporated into the film during oxidative drying via their double bonds. It is thus possible to obtain films having an improved water resistance.

A principal problem of these alkyd resin emulsions, in addition to their slow drying, is their poor pigmentability, since it is not possible to obtain glossy, highly pigmented films using the methods described above.

It was therefore the object of the present invention to find aqueous coating systems which, in comparison to the known state of the art, are distinguished by improved properties with respect in particular to their pigmentability, drying, water resistance and storage stability.

The invention relates to unsaturated polyurethanes containing from 20 to 80% by weight of polyethylene glycol units, which polyurethanes can be prepared by reacting a) at least one organic polyisocyanate, b) an unsaturated fatty alcohol or its polyalkylene glycol ether, an unsaturated fatty amine or a reaction product of an unsaturated fatty acid and a monoepoxide, c) a compound which contains not only two groups which react with isocyanate groups but also at least one group which is ionic or which can be converted into an ionic structure, d) a polyalkylene glycol having a molecular mass of from 750 to 10,000, and if desired e) a compound containing from three to six hydroxyl or amino groups, the ratio of the isocyanate groups in a) to the hydroxyl and amino groups in the remaining components being from 0.7:1 to 1.2:1.

The alkyd resins employed are commercially available types, in the solvent-free state. To increase its storage stability, the alkyd resin can be modified such that its acid number is as low as possible. This modification can either be carried out during the preparation of the alkyd resin, by esterification with further alcohols, or the acid groups can also be esterified subsequently using an epoxide. Suitable epoxide compounds are all monoepoxides, which are described in, for example, the handbook "Epoxidverbindungen und Epoxidharze" [Epoxide Compounds and Epoxy Resins] by A. M. Paquin, Springer Verlag, Berlin 1958, chapter IV, and in Lee Neville "Handbook of Epoxy Resins", 1967, chapter 2. Particularly suitable are epoxidized fatty acids and Cardura® E10 (Shell AG; Versatic acid glycidyl ester).

The polyurethanes according to the invention are reaction products of the abovementioned starting components a) to e), in which preferably from 0.1 to 0.8 mol of component b), from 0.1 to 0.8 mol of component c), from 0.1 to 0.8 mol of component d) and from 0 to 0.2 mol of component e) are employed per mole of component a).

Component a) comprises at least one organic polyisocyanate. Suitable polyisocyanates are any organic polyisocyanates known per se from polyurethane chemistry which contain isocyanate groups attached to aliphatic, cycloaliphatic and/or aromatic structures and which preferably have a molecular weight of from 168 to 1,000, preferably from 168 to 300. Suitable examples are 1,6-diisocyanatohexane (HDI), 1-isocyanato-3,3,5-trimethyl-5-isocyanatomethylcyclohexane (IPDI), tetramethylxylylene diisocyanate (TMXDI), 4,4'-diisocyanatodicyclohexylmethane, 4,4'-diisocyanatodiphenylmethane, industrial mixtures thereof with 2,4'-diisocyanatodiphenylmethane and, if desired, with the higher homologues of these diisocyanates, and 2,4-diisocyanatotoluene and industrial mixtures thereof with 2,6-diisocyanatotoluene. These diisocyanates are preferred as component a), but more highly functional polyisocyanates such as, for example, biuret-, isocyanurate- or urethane-modified polyisocyanates based on the simple diisocyanates mentioned are also suitable in principle. These derivatives generally have a molecular weight of up to 1,000. The preparation of such derivatives is described in, for example, U.S. Pat. Nos. 3,124,605, 3,183,112, 3,919,218 or 4,324,879.

The compounds of component b) contain from 5 to 60 and preferably from 12 to 40 carbon atoms, at least one hydroxyl or amino group and at least one C=C double bond. Examples of these alcohols are monounsaturated or polyunsaturated fatty alcohols, for example oleyl alcohol, linoleyl alcohol or linolenyl alcohol. It is also possible to employ ethoxylated fatty alcohols containing preferably from 1 to 20 and in particular from 1 to 10 ethylene oxide units, for example Genapol® O-020 (Hoechst AG). The analogous unsaturated fatty amines, such as Genamin®, can also be employed. Component b) preferably comprises esters obtained by reacting a monounsaturated or polyunsaturated fatty acid with a monoepoxide, for example the reaction products of linseed oil fatty acid, soybean oil fatty acid etc. with a monoepoxide such as Cardura® E10 or other monoepoxides. The fatty alcohols, fatty acids and fatty amines preferably have from 8 to 20 and in particular from 12 to 18 carbon atoms.

Component c) which contains at least one group which is ionic or can be converted into an ionic group, preferably comprises bishydroxyalkanecarboxylic acids such as, for example, dimethylolpropionic acid, although compounds containing sulfonate groups can also be employed, for example sulfoisophthalic acid, sulfoisophthalic acid (poly)glycol esters, taurine or 4-aminobenzenesulfonic acid, with mixtures of two or more of these compounds also being possible.

Component d) comprises linear polyether gtycols having a number-average molecular weight of from 750 to 10,000, preferably from 1,000 to 6,000, and at least 80 mol %, preferably 100 mol %, of whose alkylene oxide units are ethylene oxide units. The term polyethylene glycols is thus intended not only to comprise actual polyethylene glycols whose alkylene oxide units are exclusively ethylene oxide units, but also polyalkylene glycols whose alkylene oxide units are predominantly, i.e. to the extent of at least 80 mol %, ethylene oxide units. "Mixed" polyalkylene glycols of this kind are formed, for example, by using mixtures of different alkylene oxides, for example ethylene oxide and propylene oxide in a molar ratio of ~8:2, in the preparation of the polyether glycols by alkoxylation of suitable divalent initiator molecules, for example water, ethylene glycol or propylene glycol.

Examples of compounds which can be employed as component e), which contains from 3 to 6 hydroxyl and/or amino groups, are trimethylolpropane, trimethylolethane, glycerol, ditrimethylolpropane, pentaerythritol and dipentaerythritol, or diethanolamine, although it is also possible to use polyfunctional amines such as, for example, triethylenetetramine.

The preparation of the hydrophilic polyurethanes according to the invention, to be used as emulsifiers, by reacting the abovementioned starting components can be carried out in bulk or in solvents which are inert toward isocyanate groups, for example acetone, methyl ethyl ketone, ethyl acetate, butyl acetate or toluene or mixtures of such solvents, preferably while maintaining reaction temperatures of from 20° to 200° C. and in particular from 50° to 150° C. In this context, components b) to d) can be reacted simultaneously or in stages with component a).

The procedure may in practice be such that, for example, components b) to d) are taken initially and reacted with the isocyanate a) within the abovementioned temperature ranges until the NCO content has fallen to below 0.1% by weight.

In principle, the quantitative ratios of the starting components in this reaction are chosen such that a ratio of NCO/OH equivalents of from 0.7:1 to 1.2:1 is insured.

The reactions of urethane formation can be catalyzed in a manner known per se, for example with tin octanoate, dibutyltin dilaurate or tertiary amines. Similarly, the polyurethane can be protected against premature and unwanted polymerization by the addition of suitable inhibitors and antioxidants in respective amounts of from 0.001 to 0.3% by weight, based on the total mixture.

The hydrophilic polyurethanes obtained in this way which comprise unsaturated groups have a number-average molecular weight $M_n$, which can be determined by the method of gel permeation chromatography using polystyrene as a standard, of from 1,000 to 20,000, preferably from 2,000 to 15,000, a content of olefinic double bonds (calculated as —C=C—, molecular weight=24), of at least 0.3% by weight, preferably from 1.0 to 6.0% by weight, and a content of ethylene oxide units —$CH_2$—$CH_2$—O—, incorporated via polyethylene glycol, of from 20 to 90% by weight, preferably from 30 to 85% by weight.

The hydrophilic polyurethanes represent valuable dispersants for hydrophobic alkyd resins which are known per se and are not dispersible in water. These synthetic resins generally have a molecular weight $M_n$, which can be determined by the method of gel permeation chromatography using polystyrene as a standard, of from 500 to 10,000, preferably from 500 to 5,000.

Alkyd resin dispersions of this kind can be prepared by first mixing these alkyd resins with the above-described polyurethanes, in the presence if desired of one of the above-described inert solvents. These mixtures generally comprise from 50 to 95 parts by weight, preferably from 70 to 93 parts by weight, of the hydrophobic alkyd resins as a mixture with from 5 to 50 parts by weight, preferably from 7 to 30 parts by weight, of the hydrophilic polyurethanes. However, it is important to select the nature and proportions of the individual components such that the total content in these mixtures of ethylene oxide units derived from component d) is not more than 20% by weight, preferably not more than 17% by weight. To prepare the aqueous alkyd resin dispersions the mixtures are dispersed in water, which can be done by simply stirring water into the initial mixture of the synthetic resins using conventional dissolvers, or else by pouring the mixture into water with vigorous stirring. If desired, it is possible initially to add a portion of water to the above-described mixture and then to pour this mixture, with stirring, into the residual quantity of water. The resin can also be formulated as an inverse dispersion. In this way, stable oil-in-water emulsions are obtained.

These aqueous dispersions are valuable aqueous binders for coating compositions. They can be used as they are or in combination with the auxiliaries and additives known from coatings technology, for example fillers, pigments, solvents, leveling assistants and the like, for producing coatings on any desired substrates.

Suitable substrates are paper, cardboard packaging, leather, wood, plastics, nonwovens, films, textiles, ceramic materials, mineral materials, glass, metal, coated metal, synthetic leather and photographic materials such as, for example, paper provided with a photographic layer.

These coating compositions can be applied in a known manner by spraying, knife coating, roller coating, brush coating, dipping or casting. After the water and any inert solvents also used have been evaporated, the coatings can be crosslinked by curing with metal salts of siccative acids and (hydro)peroxides or other siccatives at temperatures of between room temperature and 250° C.

EXAMPLES

Example E1

55 g of linseed oil fatty acid and 51 g of Cardura® E10 are reacted at 120° C. (catalyst: chromium octanoate) until an acid number of <1 is reached (raw material III).

54 g of dimethylolpropionic acid are dissolved at approximately 80° C. in 400 g of polyethylene glycol 2000. To the solution are added 157 g of Solvesso 100 and the raw material III. The mixture is heated to 80° C. and then 171 g of tetramethylxylylene diisocyanate are added dropwise at a rate such that a temperature of 85° C. is not exceeded (about 30 min). After dropwise addition of all of the TMXDI, the mixture is stirred at the temperature for one hour and the reaction temperature is then raised to 95° C. The temperature is maintained until the isocyanate content has fallen to <0.1%. A yellowish, viscous resin is obtained.

Example E2

54.7 g of linseed oil fatty acid and 50.8 g of Cardura E10 are reacted at 120° C. (catalyst: chromium octanoate) until an acid number of <1 is reached (raw material III).

40.2 g of dimethylolpropionic acid are dissolved at approximately 80° C. in 400 g of polyethylene glycol 2000. To the solution are added 157 g of Solvesso 100 and the raw material III. The mixture is heated to 70° C. and then 105.6 g of tolylene diisocyanate are added dropwise at a rate such that a temperature of 75° C. is not exceeded (about 30 min). After dropwise addition of all of the TDI, the temperature is maintained until the isocyanate content has fallen to <0.1%. A yellowish, viscous resin is obtained.

Example E3

158 g of linseed oil fatty acid are esterified with 25.7 g of pentaerythritol, using dibutyltin oxide as catalyst, at temperatures of up to 260° C. until an acid number <5 is reached. When the mixture has cooled 400 g of polyethylene glycol 2000, 40.2 g of dimethylolpropionic acid and 185 g of Solvesso 100 are added and the mixture is heated to 70° C. 104.4 g of tolylene diisocyanate are then added dropwise at a rate such that the temperature does not exceed 75° C. After addition is complete the reaction mixture is maintained at the temperature until the NCO content has fallen to <0.1%. A brownish, viscous resin is obtained.

Example E4

35 g of Genapol O-020 (unsaturated fatty alcohol diethylene glycol ether) together with 400 g of polyethylene glycol 2000 and 20.1 g of dimethylolpropionic acid are heated to 70° C. and stirred for 15 min. 160 g of Solvesso are then added and 52.2 g of tolylene diisocyanate are added dropwise at a rate such that the temperature does not exceed 75° C. The reaction mixture is maintained at 70° C. until an NCO content of <0.1 is reached. A viscous resin is obtained.

Example E5

54.7 g of linseed oil fatty acid and 50.8 g of Cardura E10 are reacted at 120° C. (catalyst: chromium octanoate) until an acid number of <1 is reached (raw material III). 100 g of polyethylene glycol 500 are reacted with 29.6 g of dimethyl sulfoisophthalate, using propyl titanate/zinc acetate as catalyst, at temperatures of up to 240° C. until an OH number <95 is reached. 400 g of polyethylene glycol 2000, 174 g of Solvesso 100 and raw material III are then added. The mixture is heated to 70° C. and then 69.7 g of tolylene diisocyanate are added dropwise at a rate such that a temperature of 75° C. is not exceeded (about 30 min). After dropwise addition of all of the TDI, the temperature is maintained until the isocyanate content has fallen to <0.1%. A yellowish, viscous resin is obtained.

Example D1

55 g of emulsifier E1 are added to 200 g of a commercial alkyd resin (AR 680 100%) and the mixture is stirred at 70° C. for about 30 min until it is homogenous. 3 ml of aqueous ammonia (25%) are added and then 345 g of deionized water, heated at 70° C., are added dropwise very slowly with vigorous stirring (about 3 hours). A milky dispersion of viscous structure is obtained.

Example D2

55 g of emulsifier E2 are added to 200 g of a commercial alkyd resin (SAS 560 100%) which has been brought to an acid number <1 with Cardura E10, and the mixture is stirred at 70° C. for about 30 min until it is homogenous. 3 ml of aqueous ammonia (25%) are added and then 345 g of deionized water, heated at 70° C., are added dropwise very slowly with vigorous stirring (about 3 hours). A milky dispersion of viscous structure is obtained.

All of the other emulsifiers listed are processed to give dispersions in accordance with the above-described examples.

The emulsions described are very stable on storage and very readily pigmentable.

We claim:

1. An unsaturated polyurethane containing from 20 to 80% by weight of polyethylene glycol units, which polyurethane is prepared by reacting a) at least one organic polyisocyanate, b) an unsaturated fatty alcohol or its polyalkylene glycol ether, an unsaturated fatty amine or a reaction product of an unsaturated fatty acid and a monoepoxide, c) a compound which contains not only two groups which react with isocyanate groups but also at least one group which is ionic or a structural element which can be converted into an ionic group, d) a polyalkylene glycol having a molecular mass of from 750 to 10,000, and optionally e) a compound containing from three to six hydroxyl or amino groups, the ratio of the isocyanate groups in a) to the hydroxyl and amino groups in the remaining components being from 0.7:1 to 1.2:1.

2. An unsaturated polyurethane as claimed in claim 1, wherein component b) is polyunsaturated.

3. An unsaturated polyurethane as claimed in claim 1, wherein component b) is an ethoxylated $C_8$–$C_{20}$ fatty alcohol having from 1 to 20 ethylene oxide units.

4. An unsaturated polyurethane as claimed in claim 1, wherein component b) is a reaction product of an unsaturated fatty acid and a monoepoxide.

5. An unsaturated polyurethane as claimed in claim 1, wherein component c) is a bishydroxyalkanecarboxylic acid.

6. An aqueous dispersion of hydrophobic alkyd resins, comprising an unsaturated polyurethane as claimed in claim 1.

* * * * *